United States Patent [19]

Bruhnke

[11] Patent Number: 5,770,557
[45] Date of Patent: Jun. 23, 1998

[54] FABRIC SOFTENER COMPOSITION CONTAINING POLY(OXYALKYLENE)-SUBSTITUTED COLORANT

[75] Inventor: John D. Bruhnke, Spartanburg, S.C.

[73] Assignee: Milliken Research Corporation, Spartanburg, S.C.

[21] Appl. No.: 816,680

[22] Filed: Mar. 13, 1997

[51] Int. Cl.$^6$ .............................. C11D 1/38; C11D 3/00; C11D 3/40; D06P 5/13
[52] U.S. Cl. .................... 510/515; 510/419; 510/461; 510/516; 510/527; 8/403; 8/647
[58] Field of Search ................ 8/403, 647; 510/515, 510/516, 419, 527

[56] References Cited

U.S. PATENT DOCUMENTS

| | | | |
|---|---|---|---|
| 3,157,633 | 11/1964 | Kuhn | 260/200 |
| 4,134,838 | 1/1979 | Hooper et al. | 252/8.8 |
| 4,137,180 | 1/1979 | Naik et al. | 252/8.8 |
| 4,167,510 | 9/1979 | Brendle | 260/174 |
| 4,284,729 | 8/1981 | Cross et al. | 521/158 |
| 4,422,949 | 12/1983 | Ooms | 252/8.8 |
| 4,468,255 | 8/1984 | Schwartz et al. | 106/288 |
| 4,634,555 | 1/1987 | Baxter et al. | 540/126 |
| 4,703,113 | 10/1987 | Baxter et al. | 534/796 |
| 4,726,844 | 2/1988 | Greenwood | 106/22 |
| 4,732,570 | 3/1988 | Baumgartner et al. | 8/506 |
| 4,738,721 | 4/1988 | Baxter et al. | 106/22 |
| 4,767,547 | 8/1988 | Straathof et al. | 252/8.8 |
| 4,777,248 | 10/1988 | Greenwood | 534/803 |
| 4,789,491 | 12/1988 | Chang et al. | 252/8.75 |
| 5,089,148 | 2/1992 | Van Blarcom et al. | 252/8.6 |
| 5,130,035 | 7/1992 | Dell'Armo et al. | 252/8.6 |
| 5,176,745 | 1/1993 | Moore et al. | 106/22 |
| 5,183,580 | 2/1993 | Lew et al. | 252/8.6 |
| 5,204,010 | 4/1993 | Klewsaat | 252/8.6 |
| 5,207,933 | 5/1993 | Trinh et al. | 252/8.6 |
| 5,240,464 | 8/1993 | Kluger et al. | 8/506 |
| 5,250,708 | 10/1993 | Barry, Jr. | 549/226 |
| 5,270,363 | 12/1993 | Kluger et al. | 524/90 |
| 5,271,868 | 12/1993 | Azechi et al. | 252/358 |
| 5,290,475 | 3/1994 | Wixon | 252/174.23 |
| 5,300,667 | 4/1994 | Kasprzak et al. | 556/437 |
| 5,332,513 | 7/1994 | Doms et al. | 252/8.6 |
| 5,376,301 | 12/1994 | Fleuren et al. | 252/174.15 |

FOREIGN PATENT DOCUMENTS

| | | | |
|---|---|---|---|
| 0 176 195 | 4/1986 | European Pat. Off. | C09B 29/30 |
| 0 187 520 | 7/1986 | European Pat. Off. | C09B 43/16 |
| WO 94/10285 | 5/1994 | WIPO | C11D 3/40 |

OTHER PUBLICATIONS

Sela et al., "Newly designed polysiloxane–graft–poly(oxyethylene) copolymeric surfactants: prepartion, surface activity and emulsification properties," Colloid Polym Sci 272:684–691 (1994).

Ni et al., "Synthesis of a Novel Polysiloxane–based Polymer Electrolyte and its Ionic Conductivity," Polymers for Advanced Technologies, vol. 4, pp. 80–84 (1993).

*Primary Examiner*—Paul Lieberman
*Assistant Examiner*—John M. Petruncio
*Attorney, Agent, or Firm*—Terry T. Moyer; William S. Parks

[57] ABSTRACT

A fabric softener composition comprising:
  a) from 3 to 50% by weight of fabric softener, or mixtures thereof;
  b) a liquid carrier including water, the pH of the composition being less than 7, and
  c) from 1 ppm to 5000 ppm of a poly(oxyalkylene)-substituted colorant which is a liquid in its undiluted state having the structure ABXYZ, where B is a reactive dye moiety wherein A is an organic chromophore;

B is an electrophilic reactive group covalently bonded to A directly or through a linking group;

X is a nucleophilic linking group covalently bonding B and Y, selected from the group conisting of NR, O, S, and 4-oxyanilino (—HN—Ph—O—); where R is selected from the group consisting of H, alkyl, aryl, and YZ;

Y is a poly(oxyalkylene)-containing moiety; and

Z is a terminal group for Y.

18 Claims, No Drawings

FABRIC SOFTENER COMPOSITION CONTAINING POLY(OXYALKYLENE)-SUBSTITUTED COLORANT

BACKGROUND OF THE INVENTION

This invention is directed to a fabric softener composition containing a fabric softening component and a poly(oxyalkylene)-substituted colorant, and the use of such compositions for conditioning fabrics in an aqueous wash. More particularly, this invention relates to a liquid fabric softener composition comprising a colorant made from a reactive dye having an electrophilic reactive group reacted with a poly(oxyallylene)-containing moiety having a nucleophilic reactive group.

Fabric softener compositions are known in the art and are used in rinse cycles of automatic laundry operations to impart improved texture and anti-static properties to laundered fabrics. The first U.S. concentrated (6–10% active) rinse cycle fabric softener was introduced in the 1960s. These were added during the final rinse of the wash cycle and were usually quaternary types, mainly di (hydrogenated) tallow dimethylammonium chloride (DHTDMAC), although some were based on imidazoline or amido amine derivatives. The products were essentially aqueous solutions or suspensions containing 4–6% active softener, a fabric substantive fragrance and a viscosity modifier. In 1990, ultra formulations, (17–28% solids), e.g., "triple concentrates," were introduced in the U.S. and are increasing in the marketplace owing to their reduced packaging and transportation costs. Such formulations require particular care in ingredient fornulation, mixing, viscosity control, and final formulation viscosity stability in order to provide stable, low viscosity products. See, e.g., "Formulation and Production of Concentrated Rinse Cycle Fabric Softeners," Robert O. Keys, happi/March 1995, pp. 95–97, and "Fabric Conditioning Agents," George R. Whalley, happi/February 1995, pp. 55–58. Recently, formulations have reduced or replaced DHTDMAC, e.g., by ester quats or ester amines, in order to facilitate product breakdown in the ecosystem, particularly in Europe. These formulations also require special considerations to provide a commercial product of the proper viscosity.

Colorants are generally added to liquid fabric softening compositions for visual appeal to the consumer as well as identity of the product. Fabric staining caused by softener compositions can be permanent and is not always obvious to the consumer due to a relatively low incident of occurrence. Colorants employed in fabric softener compositions are preferably those which are easily removed from fabric if dye staining occurs, and therefore reduce fabric staining for commonplace fabrics such as cotton and polyester. Dyes of high color stability in the fabric softener compositions which exhibit minimal complexation or reaction with other fabric softener ingredients and the laundered fabrics themselves are of particular interest in fabric softener composition applications. Among these dyes are certain nonionic colorants which are available from Milliken Chemical Co. known as Liquitint® dyes whose incorporation in liquid fabric softening compositions is noted in published international application WO 94/10285. Certain of these dyes provide reduced staining via an increased ease of stain removal, and are stable in fabric softening compositions. These dyes can also provide high color loading and bright coloration.

Accordingly, it is desirable to provide colorants for liquid fabric softener compositions which are non-toxic, color stable, non-staining, capable of high color loading and bright coloration without precipitating out of the composition. In particular, colorants are desired which provide an increase in the ease of stain removal versus a commonly used blue dye, Acid Blue #127: 1, used in liquid fabric softener compositions.

Organic chromogens containing poly(oxyalkylene) substituents are disclosed in Kuhn, U.S. Pat. No. 3,517,633, Brendle, U.S. Pat. No. 4,167,510, Cross et al., U.S. Pat. No. 4,284,729, Baumgartner et al., U.S. Pat. No. 4,732,570, Moore et al., U.S. Pat. No. 5,176,745, Kluger et al., U.S. Pat. No. 5,240,464, and Barry, U.S. Pat. No. 5,250,708. Poly(oxyalkylene) substituted colorants made by modifying pigment are disclosed in Schwartz et al., U.S. Pat. No. 4,468,255.

Several patents and published applications assigned to ICI relate to poly(alkylene oxide)-substituted reactive dyes, for example, Baxter et al, U.S. Pat. No. 4,634,555; Baxter et al, U.S. Pat. No. 4,703,113; Greenwood et al, U.S. Pat. No. 4,726,844; Baxter et al, U.S. Pat. No. 4,738,721; Greenwood, U.S. Pat. No. 4,777,248; EP-A 0176195 to Baxter et al.; EP-A 0187520 to Greenwood.

The relatively low molecular weights of the poly(oxyalkylenes) required by the ICI art result in dyes which exhibit a high stain factor for many substrates. Moreover, the resulting dyes are solids which must be dissolved in a suitable solvent for most uses.

Polydimethylsiloxanes prepared as copolymers with alkylene oxides are widely used as surfactants. Altering the amounts of alkylene oxide (hydrophile) and dimethylsiloxane (lipophile) affects surfactant properties. The higher the alkylene oxide content the higher the hydrophilicity. Materials with ethylene oxide contents 75% and higher are freely soluble in water and low molecular weight copolymers can be used as wetting agents, anti-foggers, anti-foamants, and slip agents in inks.

SUMMARY OF THE INVENTION

The present invention relates to a fabric softener composition comprising:

1) from 3 to 50% by weight of fabric softener, or mixtures thereof;

2) a liquid carrier including water, the pH of the composition being less than 7.
and 3) from 1 ppm to 5000 ppm of a poly(oxyalkylene)-substituted colorant having the structure ABXYZ, where A is an organic chromophore;

B is an electrophilic reactive group covalently bonded to A directly or through a linking group;

X is a nucleophilic linking group covalently bonding B and Y, selected from the group consisting of NR, O, S, and 4-oxyanilino (—HN—Ph—O—); where R is selected from the group consisting of H, alkyl, aryl, and YZ;

Y is a poly(oxyalkylene)-containing moiety; and

Z is a terminal group for Y.

DETAILED DESCRIPTION OF THE INVENTION

Without limiting the scope of the invention, the preferred embodiments and features are hereinafter set forth. Unless otherwise indicated, all parts and percentages are by weight and conditions are ambient, i.e. one atmosphere of pressure and 25° C. Unless otherwise specified, aliphatic hydrocarbons are from 1–12 carbon atoms in length.

All of the U.S. patents disclosed in this specification are incorporated herein by reference in their entirety.

Formulations of suitable fabric softener compositions of the present invention except for the colorant are disclosed in U.S. Pat. No. 5,183,580 to Lew et al., U.S. Pat. No. 5,207,933 to Trinh et al., U.S. Pat. No. 5,204,010 to Klewsaat, U.S. Pat. No. 5,290,475 to Wixon, U.S. Pat. No. 5,130,035 to Dell'Armo et al., and U.S. Pat. No. 5,089,148 to Van Blarcom et al. The liquid fabric softener composition of the present invention includes 3 to 50 wt %, preferably 15 to 35 wt % of a cationic fabric softening compound, preferably a quaternary ammonium compound. The counterion may be a halide, such as fluoride, chloride, bromide, or iodide. Other counterions may be employed such as methylsulfate, ethylsulfate, hydroxide, acetate, formate, sulfate, carbonate and the like. Preferably, the counterion is chloride or methylsulfate, chloride being especially preferred for liquid fabric conditioning compositions of the present invention. Generally, concentrated liquid fabric softener compositions of the present invention can contain 17% to 50% solids. Particulate fabric softening compositions of the present invention can be prepared according to the formulation set out in U.S. Pat. No. 5,332,513 to Doms et al.

Examples of cationic quaternary ammonium salts include, but are not limited to:

(1) Acyclic quaternary ammonium salts having at least two $C_{8-30}$, preferably $C_{12-22}$ alkyl chains, such as: ditallowdimethyl ammonium chloride (Adogen® from Sherex), di(hydrogenated tallow)dimethyl ammonium chloride (Adogen 442® from Sherex), distearyl-dimethyl ammonium chloride (Arosurf TA-100® from Shearex), dicocodimethyl ammonium chloride (Variquat K300® from Sherex), and the like;

(2) Cyclic quaternary ammonium salts of the imidazolinium type such as di(hydrogenated tallow)-dimethyl imidazolinium chloride, 1-ethylene-bis(2-tallow-1-methyl) imidazolinium chloride (Varisoft 6112® from Sherex) and the like;

(3) Diamido quaternary ammonium salts such as: methyl-bis(hydrogenated tallow amidoethyl)-2-hydroxyethyl ammonium methylsulfate (Varisoft 110® from Sherex), methyl bis(tallowamidoethyl)-2-hydroxypropyl ammonium methylsulfate (Varisoft 238® from Sherex) and the like;

(4) Biodegradable quaternary ammonium salts such as N,N-di(tallowoyl-oxy-ethyl)-N,N,-dimethyl ammonium chloride and N,N-di(tallowoyl-oxy-propyl)-N,N-dimethyl ammonium chloride.

When fabric conditioning compositions employ biodegradable quaternary ammonium salts, pH of the composition is preferably adjusted to between 2 and 5. Biodegradable quaternary ammonium salts mentioned above are described more fully in U.S. Pat. Nos. 4,767,547 and 4,789,491.

Biodegradable cationic diester compounds may be employed of the type which have the formula:

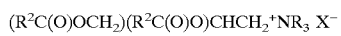

$(R^2C(O)OCH_2)(R^2C(O)O)CHCH_2{}^+NR_3\ X^-$ wherein each R is a short chain $C_1$–$C_6$, preferably $C_1$–$C_3$ alkyl or hydroxyalkyl group, e.g., methyl (most preferred), ethyl, propyl, hydroxyethyl, and the like, benzyl or mixtures thereof; each $R^2$ is a long chain $C_{10}$–$C_{22}$ hydrocarbyl, or substituted hydrocarbyl substituent, preferably $C_{15}$–$C_{19}$ alkyl and/or alkylene, most preferably $C_{15}$–$C_{17}$ straight chain alkyl and/or alkylene; and the counterion, $X^-$, can be any softener-compatible anion, for example, chloride, bromide, methylsulfate, formate, sulfate, nitrate and the like. These cationic diesters are described in greater detail in U.S. Pat. No. 4,137,180. (5) Mixtures of water-insoluble cationic fabric softener and a polyalkoxylated ammonium salt as described in U.S. Pat. No. 4,422,949. Such mixtures may be particularly suitable for incorporation in concentrated liquid fabric softener compositions.

Cationic nitrogenous salts having one long chain acyclic aliphatic $C_{8-30}$ aliphatic group, preferably $C_{12-22}$, may also be employed as the cationic fabric softening compound herein. Examples of these are set out in U.S. Pat. No. 5,183,580. These include acyclic quaternary ammonium salts, substituted imidazolinium salts, alklypyridinium salts, and alkanamide alkylene pyridinium salts.

The fabric softening component may include other fabric conditioning compounds in addition to the cationic fabric softening compounds described above. These include i) tertiary fatty amines, ii) reaction products of stearic acid and aminoethylethanolanine, iii) carboxylic acids having 8 to 30 carbon atoms and one carboxylic acid group per molecule, iv) esters of polyhydric alcohols such as sorbitan esters or glycerol stearate, v) fatty alcohol, ethoxylated fatty alcohols, alkyl phenols, ethoxylated alkyl phenols, ethoxylated fatty amines ethoxylated monoglycerides, ethoxylated di-glycerides, ethoxylated fatty amides (Varamide T55® from Sherex), vi) mineral oils, and polyols such as polyethylene glycol.

Preferred fabric softeners for use herein are acyclic quaternary ammonium salts, ditallowdimethyl ammonium chloride being most preferred.

It may be appreciated that various combinations of fabric softening components may be used by the skilled artisan without departing from the scope of the present invention.

About 3–50% of the fabric softener is used in the compositions of the invention. There must be included at least a sufficient amount of the cationic fabric softening compound to achieve anti-static effect, for example, 3% in the dilute product and at least 5% in the concentrated product. On the other hand, the entire fabric softening component may be a cationic fabric softening compound. The diluted version of the product contains about 3% to 12%, preferably 4% to 7% of the fabric softening component, based on % active. The concentrated version of the product contains 13% to 50%, preferably 13% to 30% of the fabric softening component, based on % active.

The fabric softening compositions of the present invention include a liquid carrier, which is water and which may additionally contain up to 5% organic solvents such as lower alcohols selected from, for example, methyl alcohol, ethyl alcohol, isopropanol, and butanol, or glycols, such as propylene glycol, diethylene glycol, and hexylene glycol. Both the diluted and the concentrated versions of the product are preferably dispersions of the active ingredients in the water solvent matrix. The organic solvents can improve handling, fluidity and viscosity.

According to the present invention the pH of liquid fabric softener compositions is less than 7, and is preferably in the range of from 4 to 6.5. Typically, there is no need to adjust pH of the compositions. However, if there is a need to adjust pH of the compositions, any acidic material may be used. Examples of suitable acids include hydrochloric, sulfuric, phosphoric, citric, maleic acids and the like. The pH is measured by a glass electrode in comparison with a standard calomel reference electrode.

Various additives may be optionally employed in amounts of 0.1% to 30% in the conditioning compositions of the present invention which increase performance, formulation range and stability, or which aid in dispersibility, viscosity control, and soil release. These include silicones, such as predominantly linear polydialkylsiloxanes, e.g., polydimethylsiloxanes; soil release polymers such as block copolymers of polyethylene oxide and terephthalate fatty amines selected from the group consisting of primary fatty amines, secondary fatty amines, tertiary fatty amines and mixtures thereof; amphoteric surfactants; smectite type inorganic clays; anionic soaps; zwitterionic quaternary ammonium compounds and nonionic surfactants. Nonionic additives include fatty alcohols; linear, secondary, branched, olefinic, and alkylphenol alcohol ethoxylates; mono- and di-glycerides; sorbitans; and ion pairs of anionic detergent surfactant and fatty amines. Cationic additives include monoalkyl trimethyl quaternary; ethoxylated amines; ethoxylated monoalkyl quaternary salts. Polymer additives include polyethylene oxide, polypropylene oxide, terephthalate, cyclodextrin, and guar gum. Electrolytes may be added for viscosity control in amounts of up to 5%, preferably in the range from 5 to 500 ppm. Such materials include Group IA and IIA halides, e.g., $CaCl_2$, $MgCl_2$ and NaCl, as well as alkylene polyammonium salts.

Preservatives in amounts up to 0.1% may be added to the fabric softening composition of the present invention in order to protect against microbial degradation. Such preservatives include glutaraldehyde, formaldehyde, 2-bromo-2-nitropropane-1,3-diol, and 5-chloro-2-methyl-4-isothiazolin-3-one /2-methyl-4-isothiazoline-3-one.

Other optional ingredients include emulsifiers, opacifiers, anti-shrink agents, anti-wrinkle agents, fabric crisping agents, spotting agents, antioxidants, anti-corrosion agents, optical brighteners or fluorescent agents preferably in the range from 0.01 to 5%, buffers, perfumes preferably from 0.1 to 5%, germicides, bactericides, and bacteriostatic agents. Bacteriostatic agents are preferably employed in the range from 1 to 1000 ppm.

It can be particularly desirable to include in the inventive compositions deodorant perfumes, e.g., those disclosed in U.S. Pat. No. 4,134,838. According to the present invention, the compositions preferably include from 0.01% to 10%, preferably 0.1% to 1% by weight of any suitable deodorant perfume, such as that described in the '838 patent.

The liquid fabric conditioning compositions can be prepared by conventional methods. A convenient and satisfactory method is to prepare the softening active premix at 50°–80° C., which is added with stirring to the hot water. Temperature-sensitive components can be added after the fabric softening composition is cooled to a lower temperature. The colorant may be added to the composition at anytime during its preparation. Preferably, the colorant is added to the hot water prior to the mixing with the active premix. The fabric softening compositions of the invention can be used in the rinse cycle of a conventional home laundry operation. Generally, rinse water has a temperature of from 5° C. to 60° C. The concentration of the total active ingredients is generally from 2 ppm to 1000 ppm, preferably from 10 ppm to 500 ppm, by weight of the aqueous rinsing bath. When multiple rinses are used, the fabric conditioning compositions are preferably added to the final rinse.

Typically, the amount of staining possibly imparted to the fabric by any softener depends on the type of fabric, the concentration of the dye in the composition, and whether there is a direct contact of the fabric conditioner with the fabric. Preferably, to minimize the possibility of staining, the fabric softener of the present invention is added after a laundry machine is filled or at least partially filled with water, in order to avoid direct contact of the fabric softener with fabrics in the wash. Alternatively, the fabric softener composition may be diluted with at least about an equal amount of water, and the resulting mixture may be introduced in a washing machine before or during the rinse cycle. The compositions of the invention are substantially non-staining.

Poly(oxyalkylene)-Substituted Colorant

The colorant employed in the present invention comprises a poly(oxyalkylene) substituent. The colorant may be synthesized by the reaction of a reactive dye with the polymer through a linking group. Reactive dyes can be represented as AB and are those dyes comprising an organic chromophore component A which is covalently bonded directly or through a linking group, such as an amino-containing group, to an electrophilic functional group B capable of reacting with a nucleophile to form a covalent bond either by addition or displacement.

Organic Chromophore A

A broad range of reactive dyes has been synthesized and includes those incorporating: azo groups such as monoazo, bisazo, and polyazo including their complexes with Cr, Fe, Co, and Cu; phthalocyanine; anthraquinone; aza [18] annulene; formazan copper complex; triphenodioxazine; nitroso; nitro; diarylmethane; triarylmethane; xanthene; acridene; methine; thiazole; indamine; azine; oxazine; thiazine; quinoline; indigoid; indophenol; lactone; aminoketone; hydroxyketone; and stilbene chromophores. Preferably, the reactive dye incorporates an azo, phthalocyanine or anthraquinone chromophore group.

Electrophilic Functional Group B

The reactive dye moieties AB contain organic chromophore A and at least one electrophilic functional group B. When multiple functional groups are provided, it is often desirable that the groups vary in reactivity, to maximize conversion. Examples of electrophilic functional groups which may be incorporated into the reactive dye include: monohalotriazine; dihalotriazine; monohalopyrimidine; dihalopyrimidine; trihalopyrimidine; dihaloquinoxaline; dihalopyridazone; dihalophthalazine; halobenzothiazole; mono-(m-carboxypyridinium)-triazine; amino epoxide; methylamino; sulfatoethyl sulfone; sulfatoethyl sulfonamide; chloroethyl sulfone; vinyl sulfone; phenylamino sulfone; acrylamide; alpha-haloacryloylamide; alpha, beta-dihalopropionyl amide; halosulfonyl pyrimidine; sulfatoethyl amino sulfone; sulfatopropionamide; halosulfothiazinylamide and haloacetylamide. The halo component may be selected from fluorine, chlorine and bromine. Preferably, the reactive dye incorporates an electrophilic functional group selected from monochlorotriazine, monofluorotriazine, dichlorotriazine, sulfatoethyl sulfone, vinyl sulfone, 2,3-dichloroquinoxaline, and 2,4-difluor-5-chloropyrimidine groups.

Reactive dyes meeting the above description are commercially available, described in the Colour Index, 3rd Edition, the Society of Dyers and Colourists (1971) and in the available published literature. By way of example and not limitation, the following reactive dyes may be employed: C.I. Reactive Black 5, C.I. Reactive Blue 2, C.I. Reactive Blue 4, C.I. Reactive Blue 5, C.I. Reactive Blue 7, C.I. Reactive Blue 15, C.I. Reactive Blue 19, C. I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C. I. Reactive Yellow 17, and C.I. Reactive Yellow 95.

Nucleophilic Linking Group X

The poly(oxyalkylene)-containing substituent Y is covalently bonded to the electrophilic group B of reactive dye AB through X, a nucleophilic linking group selected from the group consisting of NR, O, S, and 4-oxyanilino (≦HN—Ph—O—); where R is selected from the group consisting of H, alkyl, aryl, and YZ. Two poly(oxyalkyene)-containing substituents may be bonded to reactive dye AB through a linking group comprising a trivalent atom, e.g., N. The number of poly(oxyalkylene) chains per chromophore may be from 1–6, preferably 1–4, most preferably 1, 2 or 3.

Pololy(oxyalkyleyne) -Containing Substituent Y

Y can be a poly(oxyalkylene)-containing moiety comprising the formula $(C_aH_{2a}O)_m (C_bH_{2b}O)_n$ where a and b are different and from 1 to 8, preferably from 1 to 4, e.g., a is 2, b is 3, m is at least 3, preferably at least 11, e.g., where lower staining factor of the resulting colorant composition is desired; n is 0 to 15, e.g., 0 or 1. The molecular weight of the Y moiety can be less than 4000 and can range from 130 to 4000, preferably from 480 to 4000.

Typical of such Y substituents are poly(oxyalkylene) polymers and copolymers. Polymeric substituents are preferred. In this regard, polyalkylene oxides and copolymers of same which may be employed to provide the colorant of the present invention are, without limitation, polyethylene oxides, polypropylene oxides, polybutylene oxides, copolymers of polyethylene oxides, polypropylene oxides and polybutylene oxides, and other copolymers including block copolymers, in which a majority of the polymeric substituent is polyethylene oxide, polypropylene oxide and/or polybutylene oxide. While such substituents generally have an average molecular weight in the range of from 130 to 4000, say, 130 to 1400, they should not be so limited.

Polysiloxane-Poly(oxyalkylene) Copolymer

In a particular embodiment of the present invention, Y can be described as a polysiloxane-poly(oxyalkylene) copolymer which incorporates (a) a polysiloxane segment characterized by a —$Si(R^1)(R^2)O$— repeating group wherein $R^1$ and $R^2$ are each selected from the group consisting of alkyl, phenyl, vinyl, 3,3, 3-trifluoropropyl, and hydrogen (preferably $R^1$ and $R^2$ are alkyl, with methyl especially preferred); and (b) a polyether segment characterized by a poly(oxyalkylene) group which may be i) in the copolymer backbone or ii) pendent from a siloxane or silane repeating group.

Y copolymers having pendent poly(oxyalkylene) groups along a polysiloxane backbone may be synthesized by incorporating siloxane groups with reactive functionalities into the backbone of the polymer. The siloxane groups may be alkoxylated, esterified or otherwise provided with a poly(oxyalkylene) finctionality. Copolymers having a polysiloxane backbone and pendent poly(oxyalkylene) groups are commercially available in the Masil Silicone Surfactants product line, available from PPG Industries, Inc., Gurnee, Ill., USA.

Polysiloxane-polyether copolymers are disclosed in the following patents: Azechi et al. U.S. Pat. No. 5,271,868; Kasprzak et al. U.S. Pat. No. 5,300,667; and Fleuren et al. U.S. Pat. No. 5,376,301. Another method of synthesizing polysiloxane-polyether copolymers is disclosed by Jainlong Ni et al. "Synthesis of a Novel Polysiloxane-based Polymer Electrolyte and its Ionic Conductivity," Polymers for Advanced Technologies Vol. 4, pp 80–84 (1993). Allyl polyethers are grafted onto polysiloxane to form the copolymer. Sela et al., "Newly Designed Polysiloxane - graft - poly(oxyethylene) Copolymeric Surfactants," Colloid PolymSci 272:684–691 (1994) disclose comb grafted surfactants based on a poly(methylhydrogen siloxane)/poly(dimethylsiloxane) block copolymer backbone which is sililated with a vinyl terminated poly(oxyethylene) group.

Alternatively, the polysiloxane-poly(oxyalkylene) copolymer is a block copolymer incorporating a poly(oxyalkylene) substituted silane, e.g., copolymer incorporating silane a group having the structure —$Si(R^3$-poly(oxyalkylene))$(R^4)$—, where $R^3$ is an alkylene group, preferably methylene or ethylene, and $R^4$ is H, alkyl, or phenyl, preferably methyl. Such copolymers are commercially available, for example, the dimethylsiloxane-alkylene oxide copolymers available from Petrarch Systems, Silanes and Silicones Group, Bristol, Pa., USA.

Block copolymers having a poly(oxyalkylene) segment in the backbone may be synthesized by procedures well known in the art, and are commercially available from Dow Corning, Midland, Mich., USA under the 5103 Fluid and Q, e.g., Q2-5211, wetting agent product lines.

Y can also be described as a poly(oxyalkylene)-containing polysiloxane moiety selected from the group consisting of $(OSi(R')(R''))_iO(SiR'R'''O(C_aH_{2a}O)_m(C_bH_{2b}O)_n)_j$ and $(OSi(R')(R''))_i(R'''O(C_aH_{2a}O)_m(C_bH_{2b}O)_n)_j$ where R' and R'' are each alkyl, preferably C1 to C4 alkyl, more preferably methyl, R''' is alkylene, preferably C1 to C3 alkylene, more preferably ethylene, i and j are integers selected to provide a molecular weight for Y of 300 to 10000, preferably 450 to 5000, more preferably 800 to 1400, i is at least 3, j is at least 1, a and b are different and from 1 to 8, preferably from 1 to 4, more preferably from 2 to 3, m is at least 3, preferably 5 to 15, and n is from 0 to 15, preferably 0.

The poly(oxyalkylene)-containing substituent Y has a molecular weight which can range from 300 to 10000, preferably 450 to 5000, more preferably 800 to 1400.

Further description of the polysiloxane poly(oxyalkylene) copolymers useful in the present invention may be found in the Encyclopedia of Polymer Science and Engineering, John Wiley & Sons, Vol. 15, page 234–244 (1989) and the references cited therein.

End Group Z

The end group Z of poly(oxyalkylene)-containing substituent Y is not believed to be critical insofar as the functioning of the colorant is concerned. The end group Z can be any suitable terminal group, e.g., one selected from the group consisting of hydroxyl, alkyl, e.g., $C_1$ to $C_4$ alkyl, amino, amido, alkyl ester, e.g., acetyl, phenyl ester, alkyl ether, alkyl acetal, and BA where Y has a nucleophilic end group (such as where the polysiloxane-poly(oxyalkylene) copolymer is a diamine). The end group can itself contribute to solubility characteristics of the colorant product. Examples of other suitable terminal groups are those disclosed in U.S. Pat. No. 5,270,363 to Kluger, et al, for poly(oxyalkylene) polymers. Where Z is XBA the resulting colorant has the structure ABXYXBA where X,B, and A are as described above.

Colorant Preparation

The colorant compositions used in the present invention can be readily prepared by covalently bonding reactive dye AB (as listed above) to the poly(oxyalkylene)-containing XYZ group by heating an aqueous composition of the copolymer and the dye to a temperature of at least 40° C., preferably at least 60° C. The reaction time will vary according to the temperature employed, i.e., increasing the temperature will increase the rate of reaction. For example, at 85° C., the reaction is complete in two hours. The pH of the reaction composition is maintained to avoid protonating amine if present in the reaction mixture. A molar excess of the poly(oxyalkylene)-containing group XYZ is typically employed to insure complete conversion and to minimize the presence of unreacted and unsubstituted reactive dye, which can cause undesired staining. Acid scavenger such as sodium carbonate is preferably present in the reaction mixture, say, in about equivalent amounts. The poly(oxyalkylene)-substituted colorant of the present invention formed in the reaction composition may be concentrated or diluted as desired for a particular application by evaporation or the addition of water, respectively.

Suitable examples of XYZ reactants from which the present colorant compositions can be prepared include commercially available polyoxyalkyleneamines from the JEFFAMINE® series available from Huntsman Chemical and described in Texaco Chemical Company, New Product Development brochures as the M, D, ED, DU, BuD, T, MNPA, and EDR series. These polyoxyalkylene amines contain primary amino groups attached to the terminus of a polyether backbone which can be based on either propylene oxide (PO), ethylene oxide (EO), or mixed EO/PO. The JEFFAMINE® family consists of monoamines, diamines and triamines, which are available in a variety of molecular weights, ranging from 230 to 6000. JEFFAMINE® compounds are designated by letter and number, the latter representing approximate molecular weight. JEFFAMINES® include M-Series (monoamines), D-Series (amine-terminated polypropylene glycols), ED-Series (polyether diamines based on a predominately polyethylene oxide backbone imparting water solubility), DU-Series (urea condensate of D-Series products to provide a diamine product of increased molecular weight which is amine terminated), BuD-Series (urea condensate of D-Series products to provide a urea terminated product), and T-Series (propylene oxide based triamines prepared by reacting PO with a triol initiator, followed by amination of the terminal hydroxyl groups). These amines are further described in U.S. Pat. No. 5,270,363 to Kluger et al., at columns 7 to 12.

The solubility of the colorant used in the present invention can vary by the relative hydrophilic/oleophilic character of the poly(oxyalkylene) substituent and the end group, as well as the presence or absence of ionic groups on the organic chromophore. Preferably, the present colorant compositions are soluble in polar solvent, e.g., methanol and water. In particular, the present colorant compositions are greater than: 10%, 25%, 50%, or even 90% soluble in cold water.

In the method aspect of this invention, fabrics or fibers are contacted with an effective amount, generally from 10 ml to 150 ml (per 3.5 kg of fiber or fabric being treated) of the softener actives herein in an aqueous bath. Preferably, the rinse bath contains from 10 to 1000 ppm, preferably from 50 to 500 ppm, of the fabric softening compounds herein.

The invention may be further understood by reference to the following examples, but is not intended to be unduly limited thereby.

General Reaction Conditions for Preparation of Poly(oxyethylene)-Substituted Colorant.

One equivalent of reactive dyestuff was mixed with about 5–10% molar excess of nucleophilic polymer, one equivalent of sodium carbonate (or other suitable acid scavenger), and enough water to afford mixing. The reaction mixture was then heated to 80°–100° C. for 2–4 hrs. and the resultant solution then phase separated. The concentrated polymeric colorant phase was then brought to a neutral pH and further diluted with water if desired.

EXAMPLE 1

25 gm of C.I. Reactive Blue 19 (25%) were mixed with 7.2 gm of JEFFAMINE® M-715 available from Huntsman (formerly Texaco Chemical Co.), Bellaire, Tex., and 1.1 gm of sodium carbonate. The mixture was heated to 85° C. for two hours. The concentrated polymeric colorant was phased from the salt phase and diluted with water.

EXAMPLE 2

61.6 gm of C.I. Reactive Red 2 (50%) is mixed with 146.8 gm of Fluid Q4-3667 (poly(oxyethylene-dimethylsiloxane) copolymer), 5.8 gm of sodium carbonate, and 100 gm water. The mixture is heated to 85° C. for two hours. The concentrated polymeric colorant is then diluted with water.

EXAMPLE 3

5.9 gm of C.I. Reactive Yellow 3 were mixed with 7.2 gm of JEFFAMINE® M-1000, 1.1 gm of sodium carbonate, and 25 gm water. The mixture was heated to 85° C. for two hours. The concentrated polymeric colorant was phased from the salt phase and diluted with water.

The resulting dyes were incorporated into a concentrated (Ultra) fabric softener base formulated for the U.S. market (di(hydrogenated) tallow dimethylammonium chloride softener compound) in amounts sufficient to provide a shade consistent with commercial products (0.005 to 0.01%).

5 Hour Xenon Lightfastness was tested by placing the dyed fabric softener composition in a sealed test tube and exposing to 5 hours of xenon arc irradiation using an Atlas Weatherometer, available from Atlas Electric Devices Company, Chicago, Ill. The delta E of the test solution was measured on a Spectro-Sensor II calorimeter, available from Datacolor International, Charlotte, N.C. before coloration and before and after irradiation. % Color Retained was calculated as the ratio of the difference in delta E after irradiation and before irradiation to the delta E before irradiation.

2 Week Sunlight Lightfastness was measured by placing the dyed fabric softener composition in a sealed test tube and exposing to 2 weeks of sunlight through a south facing window. The delta E of the test solution was measured on the Spectro-Sensor II colorimeter before coloration and before and after irradiation. % Color Retained was calculated as the ratio of the difference in delta E after irradiation and before irradiation to the delta E before irradiation. (% Color Retained).

The formulations were compared with those of the corresponding Reactive Dyes (Reactive Blue 19, Reactive Red 2, and Reactive Yellow 3). The results (% color retained) are set out in Table 1 below. The colorant alone of Example 1 and its corresponding Reactive Dye (Reactive Blue 19) were tested for comparative staining abilities. The colorant to be tested was diluted with water to an absorptivity of 1 Abs/gm.cm/L. A 13-fiber test fabric, obtained from Test Fabrics Co. of Middlesex, N.J., was immersed into the colorant solution and allowed to soak for about 15 minutes. The test fabric was then air dried at least 12 hours. The test fabric was then rinsed with cold tap water until no bleeding of color occurred upon standing and then allowed to air dry. The delta E of the test fabric is measured on a Hunter Labscan available from Hunter Corporation, Reston, Va. before staining, after staining, and after washing. % Color washed out was calculated as the ratio of the difference in delta E after staining and after washing to the delta E after staining. The results (% color washed out) set out in Table 2 below show reduced staining for the colorants employed in the present invention, particularly for silk and wool.

TABLE 1

| Colorant | 5 Hour Xenon Lightfastness (% Color Retained) | 2 Week Sunlight Lightfastness (% Color Retained) |
|---|---|---|
| Example 1 | 100 | 107 |
| Example 2 | 77 | 76 |
| Example 3 | 62 | 77 |
| Reactive Blue 19 | 99 | 106 |
| Reactive Red 2 | 68 | 76 |
| Reactive Yellow 3 | 60 | 72 |

TABLE 2

| | 1 | 2 | 3 | 4 | 5 | 6 | 7 | 8 | 9 | 10 | 11 | 12 | 13 |
|---|---|---|---|---|---|---|---|---|---|---|---|---|---|
| Ex. 1 | 90.9 | 97.9 | 97.8 | 97.8 | 98.4 | 98 | 96.8 | 76.6 | 97.9 | 49.4 | 97.9 | 97.5 | 82.7 |
| RB 19 | 88.4 | 98 | 97.3 | 96.7 | 98.8 | 98.6 | 98 | 67.4 | 97.9 | 28.2 | 97.9 | 97.6 | 62.7 |

1 = Acetate, 2 = SEF, 3 = Arnel ®, 4 = Cotton (Bleached), 5 = Creslen 61 ®, 6 = Dacron 54 ®, 7 = Dacron 64 ®, 8 = Nylon 6,6 ®, 9 = Orlon 75 ®, 10 = Spun Silk, 11 = Polypropylene, 12 = Viscose, 13 = Wool There are of course, many alternate embodiments and modifications of the invention which are intended to be included within the scope of the following claims.

It is claimed:

1. A fabric softener composition comprising:
  a) from 3 to 50% by weight of a fabric softener, or mixtures thereof;
  b) a liquid carrier including water, the pH of the composition being less than 7;
and
  c) from 1 ppm to 5000 ppm of a poly(oxyalkylene)-substituted colorant which is liquid in its undiluted state having the structure ABXYZ, where
    AB is a reactive dye moiety wherein
      A is an organic chromophore, and
      B is an electrophilic group covalently bonded to A directly or through a linking group;
    X is a nucleophilic linking group covalently bonding B and Y, selected from the group consisting of NR, O, S, and 4-oxyanilino (—HN—Ph—O); where R is selected from the group consisting of H, alkyl, aryl, and YZ;
    Y is a poly(oxyalkylene)-containing moiety; and
    Z is a terminal group for Y.

2. The composition of claim 1 wherein
  A is an organic chromophore selected from the group consisting of azo, phthalocyanine, anthraquinone, aza annulene, formazan copper complex, nitroso, nitro, diarylmethane, triarylmethane, xanthene, acridene, methine, thiazole, indamine, azine, oxazine, thiazine, quinoline, indigoid, indophenol, lactone, aminoketone, hydroxyketone, and stilbene chromophores;
  B is an electrophilic reactive group selected from the group consisting of monohalotriazine dihalotriazine, monohalopyrimidine, dihalopyrimidine, trihalopyrimidine, dihaloquinoxaline, dihalopyridazone, dihalophthalazine, halobenzothiazole, amino epoxide, methylamino, sulfatoethyl sulfone, sulfatoethyl sulfonamide, chloroethyl sulfone, vinyl sulfone, phenylamino sulfone, alpha-haloacryloylamide, alpha, beta-dihalopropionyl amide, halosulfonyl pyrimidine, sulfatoethylamino sulfone, sulfatopropionamide, halosulfothiazinylamide, and haloacetylamide, covalently bonded to A directly through a linking group;
  Y comprises an element selected from the group consisting of
    i) $(C_aH_{2a}O)m(C_bH_{2b}O)_n$ where a and b are different and from 1 to 9, m is at least 3, n is 0 to 15; and
    ii) poly(oxyalkylene)-containing polysiloxane; and
  Z is a terminal group of Y, selected from the group consisting of hydroxyl, alkyl, amino, amido, alkyl ester, phenyl ester, alkyl ether, alkyl acetal, and BA where Y has a nucleophilic end group.

3. The composition of claim 2 wherein said poly (oxyalkylene)-containing polysiloxane is a polysiloxane-poly(oxyalkylene) copolymer having a backbone and a molecular weight of 300 to 10000 which comprises:
  (a) a polysiloxane segment characterized by a —Si($R^1$)($R^2$)O— repeating group wherein $R^1$ and $R^2$ are each selected from the group consisting of alkyl, phenyl, vinyl, 3,3,3-trifluoropropyl, and hydrogen; and
  (b) a polyether segment characterized by a poly (oxyalkylene) group which is i) in the copolymer backbone or ii) pendent from a siloxane or silane repeating group, aid poly(oxyalkylene) group comprising 5 to 95 wt % of Y.

4. The composition of claim 3 wherein Y comprises a poly(oxyalkylene)-containing polysiloxane moiety formula selected from the group consisting of $(OSi(R')(R''))_iO(SiR'R'''O(C_aH_{2b}O)_m(C_bH_{2b}O)_n)_j$ and $(OSi(R')(R''))_i(R'''O(C_aH_{2a}O)_m(C_bH_{2b}O)_n)_j$ where $R'$ and $R''$ are each alkyl, $R'''$ is alkylene, i and j are integers selected to provide a molecular weight for Y of 300 to 10000, i is at least 3, j is at least 1, a and b are different and from 1 to 8, m is at least 3, and n is from 0 to 15.

5. The composition of claim 2 wherein
  A is selected from the group consisting of azo, phthalocyanine and anthraquinone chromophores;
  B is selected from the group consisting of monochlorotriazine, dichlorotriazine, monofluorotriazine, sulfatoethylsulfone, vinyl sulfone, 2,3-dichloroquinoxaline and 2,4-difluor-5-chloropyrimidine;
  X is NR where R is selected from the group consisting of H, alkyl, aryl, and YZ; and
  Z is a terminal group for Y, selected from the group consisting of OH, $C_1$ to $C_4$alkyl, acetyl, amino, and amido.

6. The composition of claim 5 wherein
  A is anthraquinone;
  Y is a poly(oxyalkylene)-containing moiety comprising the formula $(C_aH_{2a}O)_m(C_bH_{2b}O)_n$ where a is 2, b is 3; and Z is selected from the group consisting of OH and amino.

7. The composition of claim 4 wherein R' and R" are each methyl, a is 2, b is 3, and n is at least 1.

8. The composition of claim 4 wherein R' and R" are each methyl, a is 2, and n is 0.

9. The composition of claim 4 wherein R' and R" are each methyl, a is 3, and n is 0.

10. The composition of claim 2 wherein AB is selected from the group consisting of C.I. Reactive Black 5, C.I. Reactive Blue 2, C.I. Reactive Blue 4, C.I. Reactive Blue 5, C.I. Reactive Blue 7, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C. I. Reactive Yellow 17, and C.I. Reactive Yellow 95; and Y has a molecular weight ranging from 300 to 10,000.

11. The composition of claim 2 wherein AB is selected from the group consisting of C.I. Reactive Blue 2, C.I. Reactive Blue 4, C.I. Reactive Blue 5, C.I. Reactive Blue 7, C.I. Reactive Blue 15, C.I. Reactive Blue 19, C.I. Reactive Blue 27, and wherein Y has a molecular weight ranging from 450 to 5,000.

12. The composition of claim 11 wherein AB is selected from the group consisting of C.I. Reactive Blue 7, C.I. Reactive Blue 19, C.I. Reactive Red 2, and C.I. Reactive Yellow 3.

13. The composition of claim 12 wherein AB is selected from the group consisting of C.I. Reactive Blue 19, C.I. Reactive Red 2, and C.I. Reactive Yellow 3.

14. The composition of claim 1 wherein the composition comprises 3% to 12% of said fabric softener.

15. The composition of claim 1 wherein the composition comprises 13% to 30% of said fabric softener.

16. The composition of claim 1 wherein the fabric softener is selected from the group consisting of acyclic quaternary ammonium salts having at least two $C_{8-30}$ alkyl chains, quaternary ammonium imidazolinium salts, diamido quaternary ammonium salts, biodegradable quaternary ammonium salts and mixtures thereof.

17. The composition of claim I wherein the pH of the composition ranges from 4 to 6.5.

18. A method for softening fabrics comprising treating the fabrics in an aqueous bath with the fabric softener composition of claim 1.

* * * * *

UNITED STATES PATENT AND TRADEMARK OFFICE
CERTIFICATE OF CORRECTION

PATENT NO. : 5,770,557
DATED : June 23, 1998
INVENTOR(S) : Bruhnke, John D.

It is certified that error appears in the above-identified patent and that said Letters Patent is hereby corrected as shown below:

Title page,
Item [57], ABSTRACT,
Line 34, after the word "where" delete "B" and insert -- AB --

Column 11,
Line 60, after the word "of" delete "monohalotriazine dihalotriazine".

Column 12,
Line 9, after the word "to" delete "9" and insert -- 8 --.
Line 50, after the word "claim" delete "2" and insert -- 3 --.

Signed and Sealed this

Ninth Day of March, 2004

JON W. DUDAS
*Acting Director of the United States Patent and Trademark Office*